United States Patent
Derakhshani et al.

(10) Patent No.: US 12,413,865 B1
(45) Date of Patent: Sep. 9, 2025

(54) SYSTEM AND METHODS FOR CAMERA CHALLENGE RESPONSE TO ASCERTAIN CAMERA PIPELINE INTEGRITY AND TO DETECT DIGITAL INJECTIONS, VIRTUAL CAMERAS, AND CAMERA PIPELINE ATTACKS

(71) Applicant: Jumio Corporation, Palo Alto, CA (US)

(72) Inventors: Reza Derakhshani, Shawnee, KS (US); Haonan Li, Lenexa, KS (US); Vikas Gottemukkula, Alexandria, VA (US)

(73) Assignee: Jumio Corporation, Sunnyvale, CA (US)

( * ) Notice: Subject to any disclaimer, the term of this patent is extended or adjusted under 35 U.S.C. 154(b) by 187 days.

(21) Appl. No.: 18/148,603

(22) Filed: Dec. 30, 2022

(51) Int. Cl.
*H04N 23/80* (2023.01)
*H04N 17/00* (2006.01)
*H04N 23/63* (2023.01)

(52) U.S. Cl.
CPC ........... *H04N 23/80* (2023.01); *H04N 17/002* (2013.01); *H04N 23/633* (2023.01)

(58) Field of Classification Search
CPC .... H04N 23/80; H04N 17/002; H04N 23/633; H04N 9/7973; H04N 9/79; H04N 21/239; H04L 67/10; G06T 7/80; G06F 16/50
See application file for complete search history.

(56) References Cited

U.S. PATENT DOCUMENTS

| | | | |
|---|---|---|---|
| 8,855,712 B2 * | 10/2014 | Lord | G06F 16/50 348/222.1 |
| 11,637,998 B1 * | 4/2023 | Pieper | H04N 9/7973 348/207.99 |
| 2019/0087198 A1 * | 3/2019 | Frascati | H04N 9/79 |
| 2020/0011887 A1 * | 1/2020 | Spong | B01L 3/50 |
| 2021/0279469 A1 * | 9/2021 | Holland | G06V 10/141 |
| 2021/0327018 A1 * | 10/2021 | Carranza | H04L 67/10 |
| 2021/0377623 A1 * | 12/2021 | Larson | H04N 21/239 |
| 2021/0390677 A1 * | 12/2021 | Do | G06T 11/60 |
| 2022/0343476 A1 * | 10/2022 | Feder | G06F 16/5838 |

* cited by examiner

*Primary Examiner* — Hung H Lam
(74) *Attorney, Agent, or Firm* — Patent Law Works LLP (57) ABSTRACT

A technique for interrogating a camera pipeline is disclosed. The camera pipeline is issued a challenge command instructing a response by the camera pipeline. The challenge may include the camera pipeline capturing images at specified camera parameter values. The captured images are analyzed for features corresponding to images captured from a real camera pipeline.

13 Claims, 7 Drawing Sheets

---

Interrogate a camera pipeline with a challenge including a camera parameter change 402

↓

Monitor camera response(s) 404

↓

Analyze camera response(s) to generate a score indicative of camera pipeline integrity 406

SYSTEM AND METHODS FOR CAMERA CHALLENGE RESPONSE TO ASCERTAIN CAMERA PIPELINE INTEGRITY AND TO DETECT DIGITAL INJECTIONS, VIRTUAL CAMERAS, AND CAMERA PIPELINE ATTACKS

TECHNICAL FIELD

The present disclosure is related to techniques to prevent digital attacks of a camera.

BACKGROUND

Many modern computing devices include a camera. As examples, smartphones, tablet devices, and other consumer devices often include a camera. However, digital attacks on cameras are of increasing concern. This includes camera hijacks, digital replays (including deep fakes), camera driver takeovers, and virtual cameras for injected imagery. Attacks that attempt to bypass a real camera for nefarious purposes are on the rise. This is of concern for a variety of applications, including applications that use camera images of a user to generate user authentication information.

SUMMARY

A technique is disclosed to issue challenges to a camera pipeline. The responses are monitored and used to generate an output indicative of an integrity of the camera pipeline.

One implementation of a method includes interrogating a camera pipeline with instructions of a challenge requesting a response by the camera pipeline. The response of the camera pipeline is analyzed for features associated with a real camera pipeline response. An output is generated indicative of an integrity of the camera pipeline.

In one implementation, the challenge includes instructions for the camera pipeline to respond with at least one image captured utilizing a specified selection of camera parameter values.

In one implementation, the challenge comprises instructions for the camera pipeline to respond with a sequence of images captured utilizing a specified selection of camera parameter values. Features of the sequence of images are analyzed.

In one implementation, the challenge comprises instructing the camera pipeline to reply with a camera response corresponding to a sequence of captured images utilizing different selections of camera parameter values. The sequence of captured imaged is analyzed for features associated with a real camera pipeline response for the corresponding camera parameters values. In one implementation, generating an output comprises generating a confidence score indicative of the integrity of the camera pipeline. In one implementation generating the output comprises weighting results for each of the captured images in the sequence. In one implementation, a classifier fuses results of a feature analysis of each of the images in the sequence of images. In one implementation, the camera parameter values include at least one of a camera gain setting, a camera aperture setting, a camera shutter speed setting, a camera light source setting, a camera auto-balance setting, a white balance setting, a focus setting, an exposure setting, a resolution setting, an anti-flicker setting, an optical image stabilization setting, and a rolling shutter setting.

DETAILED DESCRIPTION

Figure 1A:
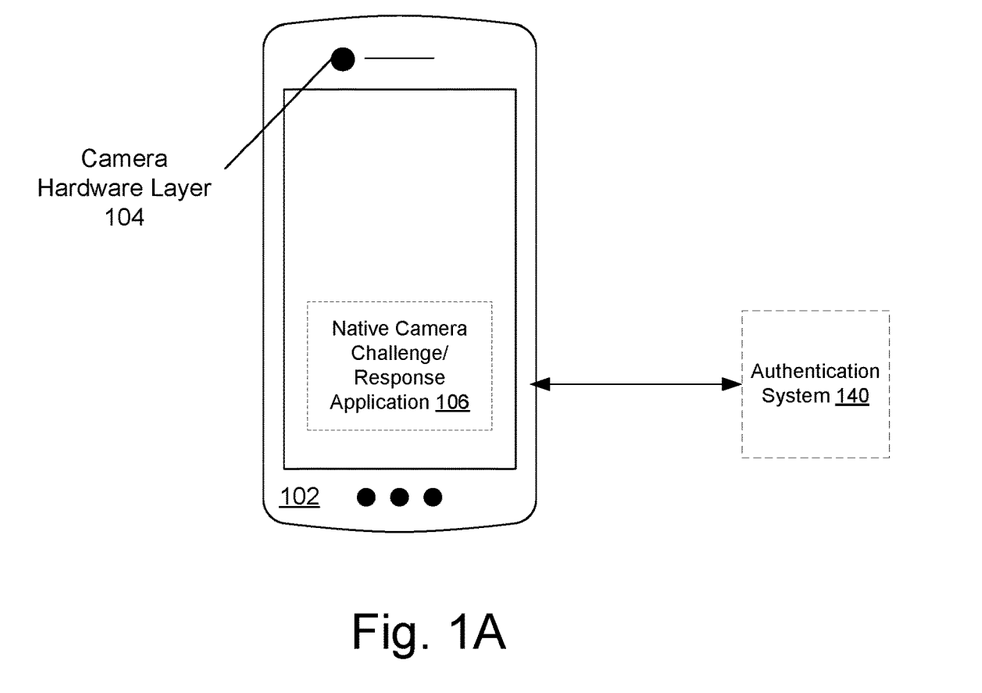
FIG. 1A illustrates an example of a computing device with a camera for verifying integrity of a camera pipeline in accordance with an implementation.
Figure 1B:
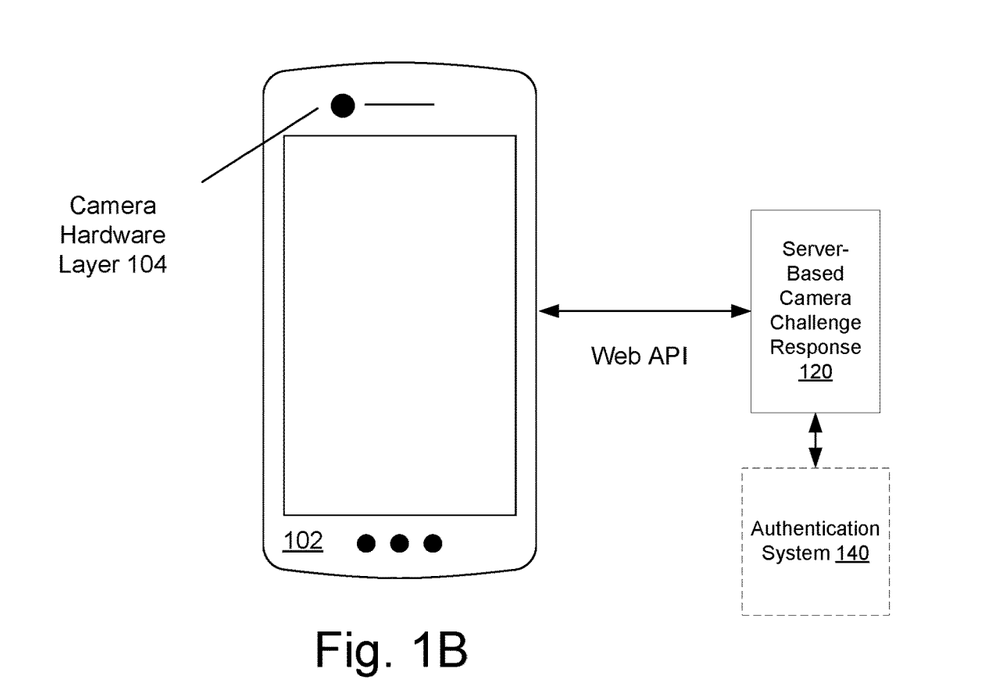
FIG. 1B illustrates an example of a computing device with a camera for verifying integrity of a camera pipeline in accordance with an implementation.
Figure 1C:
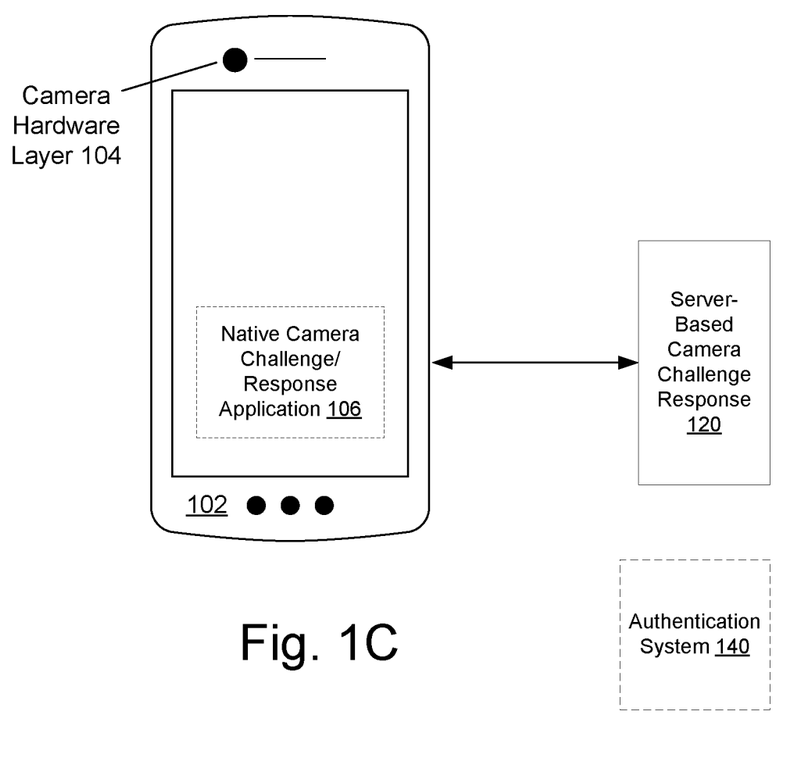
FIG. 1C illustrates an example of a computing device with a camera for verifying integrity of a camera pipeline in accordance with an implementation.

As illustrated in FIG. 1A, FIG. 1B, and FIG. 1C a client computing device 102, such as a smartphone, includes a camera hardware layer 104. For example, as illustrated in FIG. 1A, an application 106 executing on the client device 102 may be responsible for interrogating the camera and making decisions whether to reject or verify the camera. The application 106 may report its results to an external authentication system 140, although it could alternatively take protective actions on the client computing device to prevent potential fraud. As illustrated in FIG. 1B, alternatively an external entity (e.g., a server) could interrogate the camera, such as through a Web API (e.g., a JavaScript API that a browser would provide for web page interactivity). As illustrated in FIG. 1C, a hybrid approach could also be utilized for some technical features of the challenge-response interrogation are performed on the client computing device, and some features are performed externally. In some implementations, a camera application programming interface (API) may be used by a client application 106 to issue instructions for instructing a camera pipeline to change one or more camera parameter settings of the camera pipeline. Alternatively, an external server may use a Web API to access features of the camera pipeline available through the camera API.

In one implementation, a challenge-response interrogation of a camera pipeline is performed to ascertain the integrity of a camera pipeline. The interrogator (e.g., a software entity on a client device, or a remote server-based entity providing instructions via the Internet) issues one or more instructions that challenges the camera pipeline. The camera pipeline is given instructions to generate a response, such as to capture and provide to the interrogator images (image frames) taken at specific camera parameter values.

A real camera can be modelled as exhibiting specific types of image behavior in response to specific camera parameter values. There are a variety of differences between the response of a real camera in comparison to what would be received if the camera was compromised by camera hijacks, digital replays (including deep fakes), camera driver takeovers, or virtual cameras for injected imagery. Interrogating the camera pipeline in one or more challenge-response patterns provides a way to identify if the response corresponds to that expected from a real camera pipeline.

The response of the camera pipeline, to the instructions of a challenge, is evaluated to determine if the camera pipeline response is what would be expected from the output of a real camera pipeline that has not been bypassed, synthesized, or otherwise compromised. However, in some implementations, the interrogator could issue other challenges such as requesting metadata from the camera pipeline, requesting metadata from an operating system associated with the camera pipeline, or requesting metadata both, as an additional type of challenge to the identity of the camera pipeline. Additionally, in some implementations, a challenge-response protocol is implemented as one or more instructions for post-processing of images, such as modifying an image preview function to prompt a user to alter how they interact with the camera.

A single discrete challenge may be used, such as instructing a camera pipeline to capture and provide an image at specific camera parameter values. However, more generally, a complex challenge may include two or more discrete challenges. While interrogating the camera pipeline for a single camera parameter change may be useful, interrogating the camera pipeline for instructions corresponding to a sequence of different camera parameter values may provide more robust protection against different potential threats. For example, a sequence of images may be captured starting with an initial image $I_0$ followed by a sequence of images each with different camera parameters value from 1 to N, e.g., $I_1 \ldots I_N$. It should be noted that many variations of a sequence of images are possible. As one example, a single camera parameter may have values varied in a sequence (e.g., low, medium, and high gain settings) to monitor a progression of image changes. Specific parameter values could be selected (e.g., a specific gain setting). Combinations of two or more different parameter values could be selected. There are many possible options to select a sequence of images captured with different camera parameter values to aid in verifying the integrity of the camera pipeline.

Additionally, in some cases, it may take a while for a command to change a camera parameter value to fully reflect itself in the captured image due to various physical time delays, such as those delays associated with electromechanical camera components. Some changes to camera parameter values take more than one frame to fully reflect themselves in captured images. To address this issue, a sequence of images at the same nominal camera parameter settings to account for a time delay response. However, this time evolution can also be useful to distinguish a real camera from a virtual camera.

In one implementation, the results of a set of different discrete challenges are weighted to generate an overall score (e.g., a confidence score) indicative of the integrity of the camera. As an illustrative but non-limiting examples, a camera pipeline may have camera parameters with selectable settings (i.e., parameter values), such as an aperture setting, a gain setting, a shutter speed setting, a lighting setting, a white balance setting, a resolution setting, etc. Images can be captured at different camera parameter settings, analyzed for image features consistent with the image being captured at the instructed camera settings, and an overall score generated.

The camera pipeline may be included in a client computing device having a camera, such as a smartphone, a tablet device, a laptop computer, and a notebook computer, as a few examples. The client computing device may include, for example, one or more processors, a memory, an operating system, local applications stored on a device memory, a user interface, and features related to the camera, such as a camera hardware layer, an image processing layer, a camera API, and a flash or other camera light source and light sensors. There may also be other types of sensors and controllers associated with the computing device and the camera, such as camera stabilization components. In some implementations, the camera API is standard camera API. For example, the Android® platform has a camera stack and a camera API for a camera device application to communicate a request for image capture for a set of camera parameters. The camera API may also in some implementations be used to adjust image processing parameters and a preview.

Figure 2:
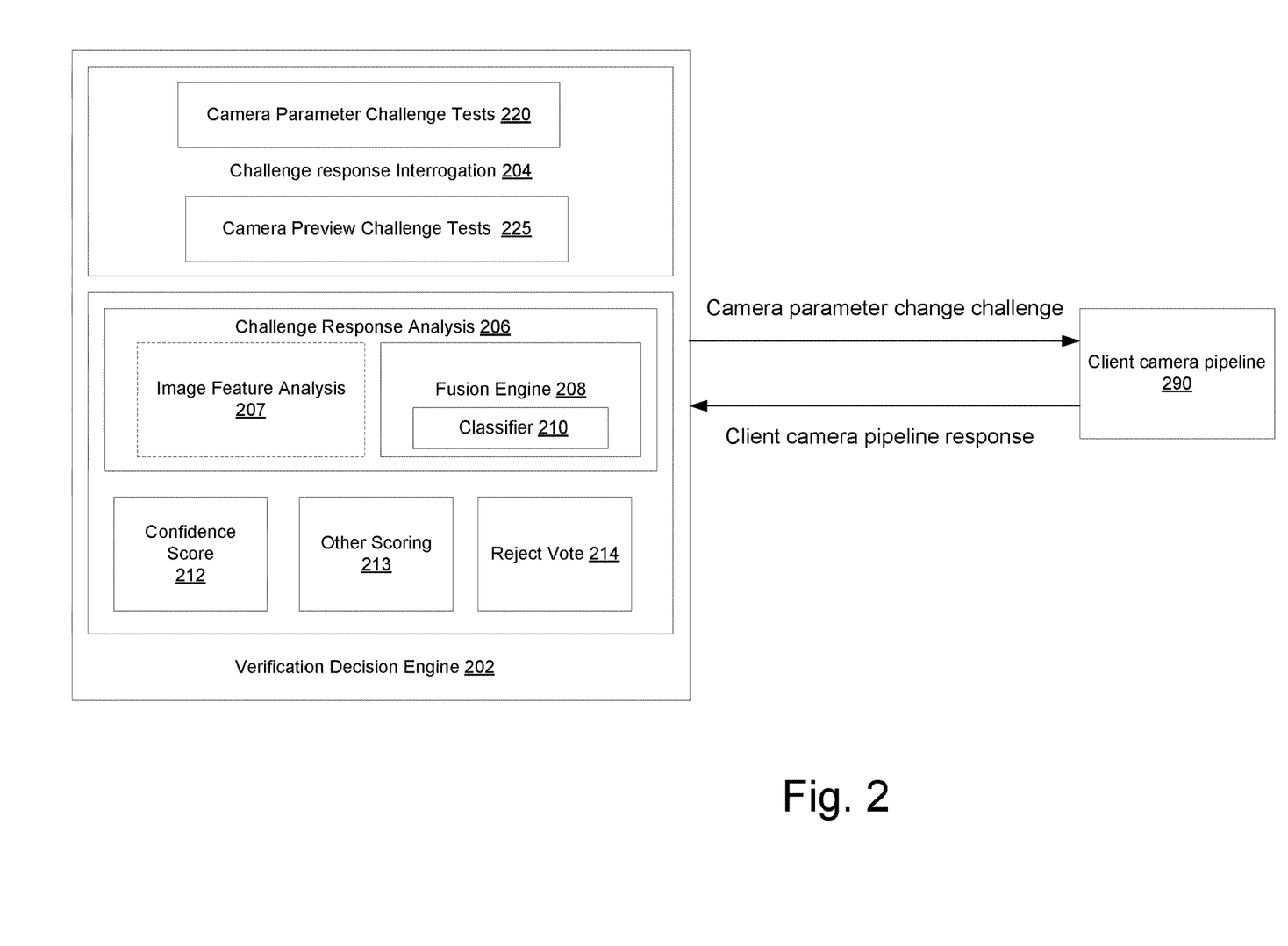
FIG. 2 illustrates a verification decision engine in accordance with an implementation.

As illustrated in FIG. 2 a verification decision engine 202 interrogates a client camera pipeline 290. A challenge response interrogation module 204 includes a set of discrete challenges that the client camera pipeline 290 can be instructed to perform. The discrete challenges that are used may be selected based on factors like the desired security level, available APIs, and the parameters of the client camera pipeline that are selectable via an API. In one implementation, the challenges are selected from camera parameter challenge tests 220 in which camera parameter values are changed. Alternatively, in some implementations, camera preview challenge test 225 may be used, such as modifying a camera preview to prompt a user to take an action, such as taking another picture or force the user to center their face in the modified preview. In such cases, the modified preview is dynamically adjusted using the location of the detected face in the first few frames that are captured before preview is visible to the user. In one implementation, the digital artifacts (for synthetic or Deep Fake images) as a result of the forced motion can be used to detect injection-based attacks. In one implementation, the camera injection attack can be detected if the user's face pose (e.g., pitch, roll and yaw) does not change between the image captured before preview and the image captured after the user centered their face in the modified preview.

A challenge response analysis module 205 analyzes the client camera pipeline responses. In some implementations, this may include generating a vote 214 to reject verifying the camera's integrity (e.g., to generate a rejection vote when there is strong evidence of a digital takeover). In some implementations a confidence score 212 is generated, although other types of scoring 213 could also be used.

Each sub-challenge that changes a camera parameter value may have its own behavioral model. For example, the effect on camera images of changing a camera gain setting can be modeled. The captured images may be analyzed for image features that are expected to change according to a behavioral model for the camera for specific camera parameter values.

An image feature analysis module 207 may be programmed to analyze a set of image features relevant to the sub-challenges and generate a score signal. For example, for an image captured at a high gain setting, the image analysis may identify image features consistent with the image being captured at a high gain setting. That is, models may be used to score features of images that the camera pipeline was supposed to have captured at specific camera parameter values.

A fusion engine 208 may be provided to generate a combined score from the output signals of the models used for each of the discrete challenges. For example, if 20 different images are captured for 20 different camera parameter values, a combined score for the results of the 20 sub-challenges may be combined (fused) to generate a combined score indicative of the overall camera pipeline integrity. In some implementations, a machine learning model may be used to train a meta classifier 210 to combine results from the different sub-challenges.

Figure 3:
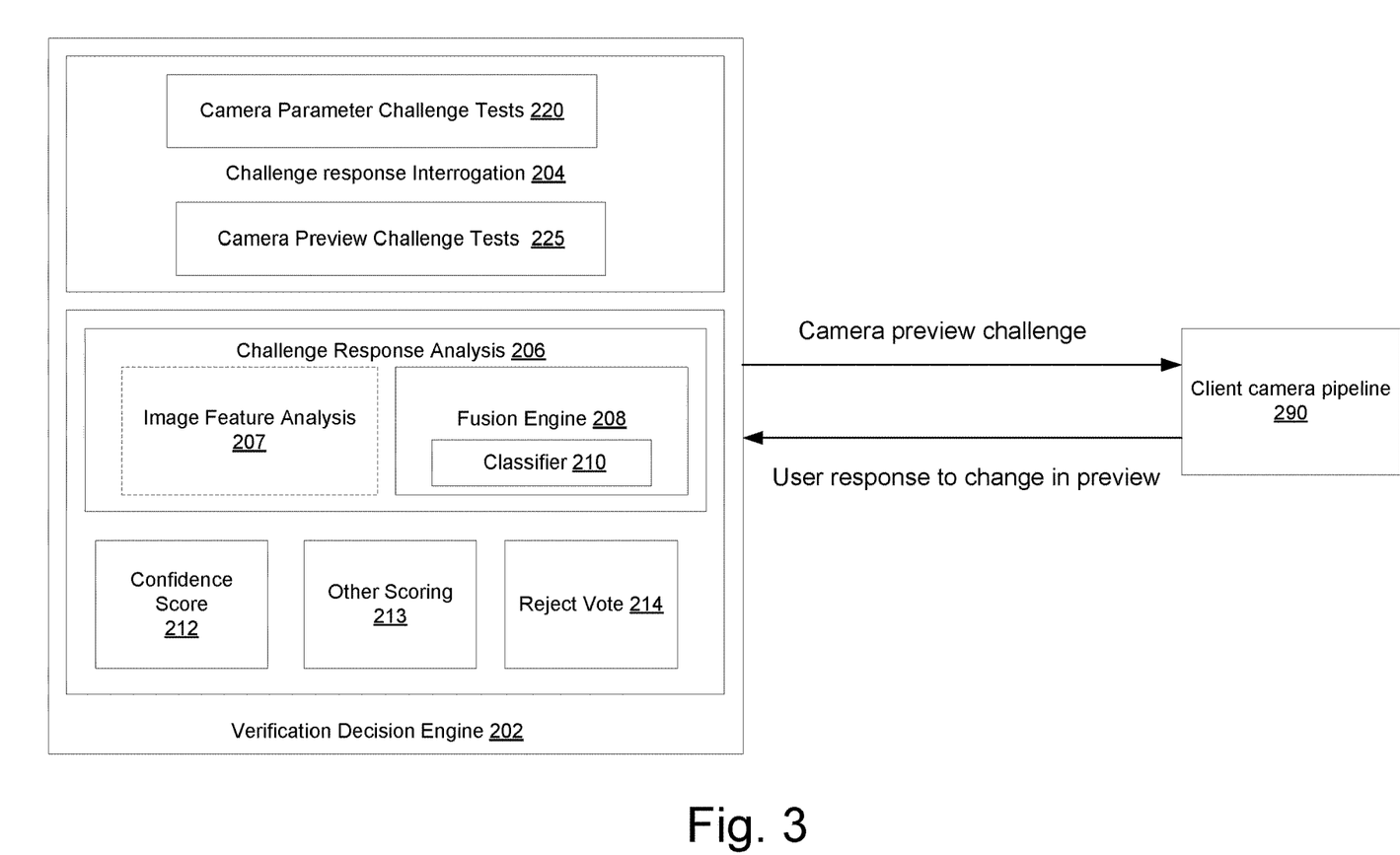
FIG. 3 illustrates a variation in operation of the verification decision engine of FIG. 2 in accordance with an implementation.

FIG. 2 illustrates an example in which the challenge includes instructing the camera pipeline to implement camera parameter changes. However, as illustrated in FIG. 3, in some implementations, the challenge includes instructing the camera pipeline to alter a camera preview.

In some implementations, the verification decision process depends in part on a requested security level. For example, there may be two, three, or more different security levels. (e.g., high/low or high/medium/low). In one implementation the verification decision engine 202 has a decision threshold and/or a fusion rule that is determined by the requested security level.

Figure 4:
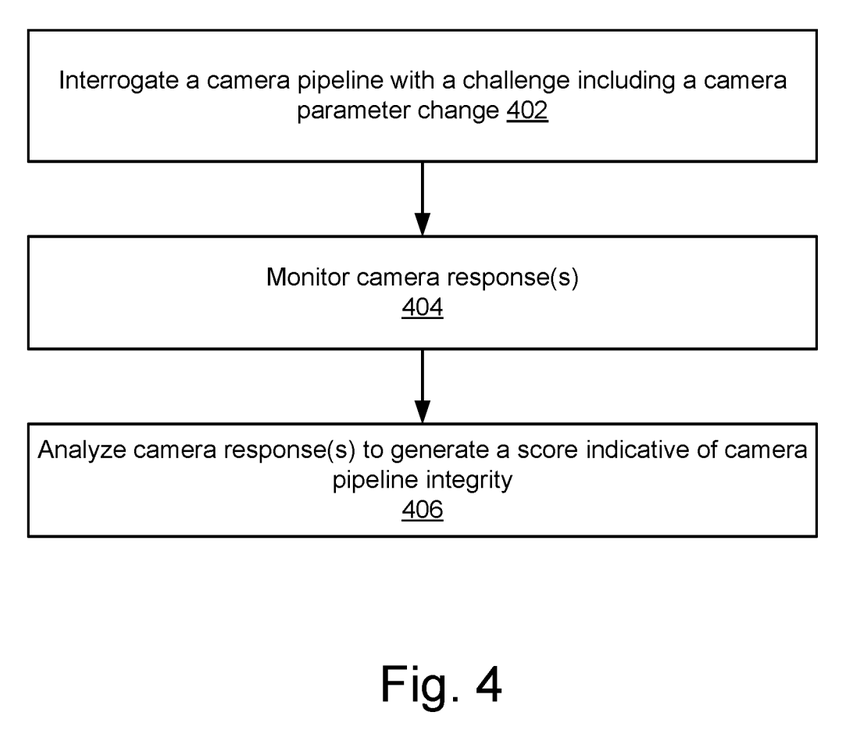
FIG. 4 is a flowchart of a method in accordance with an implementation.

FIG. 4 is a high-level flowchart of a method in accordance with an implementation. In block 402, the interrogation includes at least one camera change command to challenge the camera integrity. In block 404, the camera response is monitored. In block 406, the camera response(s) are analyzed and may be used to generate a score indicative of camera pipeline integrity.

Figure 5:
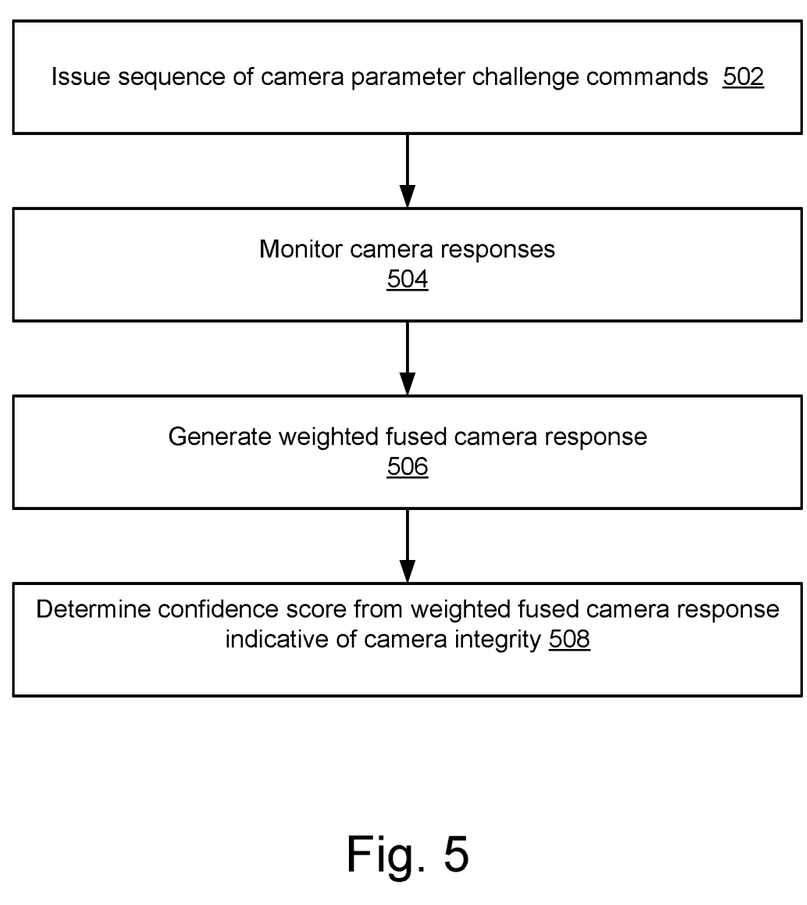
FIG. 5 is a flowchart of a method in accordance with an implementation.

FIG. 5 is a flow chart of a method in accordance with an implementation. In block 502, a sequence of camera parameter change commands is issued. In block 504 camera responses are monitored. In block 506, a weighted fused camera response is generated. For example, a meta classifier may be utilized. The meta classifier may, for example, be trained using machine learning techniques to learn rules for combining signals from the analysis of different challenges. In block 508, a confidence score is determined from the weighted fused camera response that is indicative of camera integrity.

Figure 6:
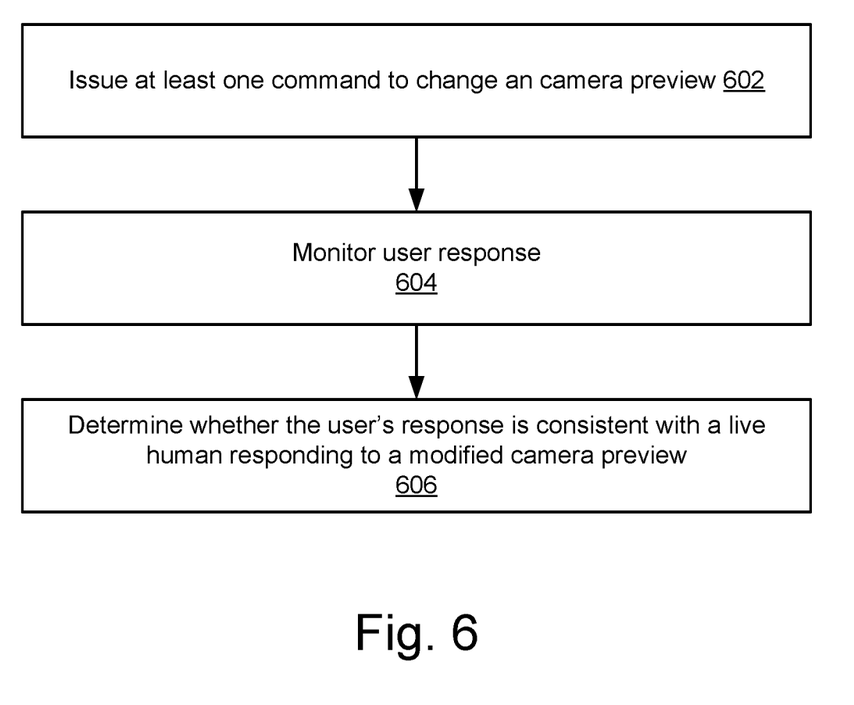
FIG. 6 is a flowchart of a method in accordance with an implementation

FIG. 6 illustrates an alternate example in which at least one command is issued to change a camera preview. The at least one command could be implemented on a laptop or desktop device with a Web interface. It may also be implemented on mobile devices by applications using the camera APIs of mobile devices. For example, in the Android® operating system, the camera preview can be adjusted using APIs to implement commands to crop, scale, rotate, tilt, zoom in, zoom out, change aspect ratio, etc. This permits an interrogator to issue a command to change the appearance of a camera preview, by for example, rotating the preview to generate a tilt. For example, the preview could rotate the image by ten degrees as one example. The challenge can thus include one or more commands that make changes in how the preview looks to a human user at the client computing device. For example, if a user is asked by an authentication application to take a photo of their face, altering the preview may result in the user taking an action based on seeing the altered preview. For example, if preview has a tilt function applied that results in the user's head appearing to be tilted to the left, the user may tilt their response by tilting their head to the right to compensate. That is, the preview can be used to trigger a real human user to attempt to move themselves, relative to their camera.

A non-exclusive set of examples of discrete challenge-response interrogations will now be discussed. While an individual camera parameter might be used in a single challenge, more generally, a sequence of challenges may be used, depending on which camera parameters are selectable for a given camera pipeline and the available APIs.

For the purposes of assessing camera pipeline integrity, camera behavioral models can be created to identify specific parameter values (or parameter value ranges) that are useful for assessing the integrity of the camera pipeline. For example, a camera behavioral model may identify a set of parameter and parameter values or (parameter value ranges) that result in measurable changes to features of captured camera images.

The camera behavioral model may further include various sub-models that identify key features for identifying a real camera response. Each sub-model may be used to either identify specific camera parameter settings (e.g., a gain of 24) or to describe a methodology for varying camera parameter settings in a progression to observe certain changes in image features.

In one implementation, the challenge to the camera pipeline is a challenge to change camera gain. Changing gain (which is loosely connected with ISO) changes the incoming image's brightness (approximately linearly for de-gamma'ed images). Increasing the gain far enough results in image noise and causes saturated pixels and clipping in brighter spots. An image captured at a very high gain would have detectable image features such as higher average pixel values, image noise, saturated pixels, and clipping in bright spots.

In one implementation, if the camera aperture is variable, and can be controlled, the challenge includes changing the aperture. Increasing the camera aperture causes a similar response as changing camera gain, except for the noise part. Changing capture aperture changes depth of field (the smaller the aperture, the deeper the in-focus range).

In one implementation, the challenge is to change the shutter speed (also known as integration time). Changing the shutter speed changes image brightness in a similar fashion to gain (longer integration time increases image brightness similar to increasing the gain). However, increasing the integration time reduces image noise. In the case of camera and/or subject motion, decreased shutter speed induces a motion blur for the parts of the image that are in motion. The motion blur can be detected via a point spread function (PSF), the fast Fourier transform (FFT), and other motion blur detection techniques. The motion of the camera can be derived from an inertial measurement unit (IMU) or in general from the video/image sequence itself, can be accentuated. The shutter speed (SS) also affects the maximum frame rate and caps it at 1/SS, so the effects of its increase are indirectly seen from a slowing of an otherwise high frame rate in a real camera system.

In one implementation. The challenge is related to a lighting setting for a light source. Consider a camera with a light source, such as a torch, flash, or a backlit screen (these sources may emit visible light, or IR light in case of night vision or three-dimensional sensing). The light source may be activated to see the response of object(s) being imaged, with foreground being expected to show a greater degree of reflection change between flash on/off events. The photic response can be detected after the illumination challenge. Randomizing the onset of illumination emission can be employed as another security measure. A lack of such response (reflected lighting in the temporal vicinity of the illumination trigger) indicates a camera hijack attack or similar problem, (unless the environment is extremely bright and thus drowning the light source).

In one implementation, challenges are triggered based on triggering auto exposure (AE) by changing the scenery/illumination (e.g., via camera movement) and recording whether the reported frame metadata shows a difference in exposure settings (e.g., ISO or exposure time/frame rate. Dark scenery may increase exposure time and drop the frame rate on top of gain increases during AE). The opposite is true, meaning that if an auto exposure lock command is sent to the camera, changing the scenery/illumination/subject composition should not change the exposure parameters of the incoming images while the exposure lock is in place. In another implementation, when the API orders the camera to auto-expose on a bright vs dark patch of the captured scene, the resulting exposure would go down/go up and thus make the incoming image overall darker/brighter, respectively.

In one implementation, the challenge is to change the white balance settings of the camera (e.g., from incandescent to fluorescent) and testing whether the expected change in color temperature/hue takes place in the resulting images. For example, in general the change of white balance should be reflected in the relative changes of R, G, and B histograms (e.g., from cooler/bluer to warmer/redder).

In one implementation, the challenge, for cameras with a physical focus and a wide enough aperture, is to change the focus settings either semi-automatically by placing the focus point on e.g., a closest foreground vs a far background and measure the expected defocus of background vs foreground. If the camera API allows for direct manipulation of focus, one can use the simple focus/defocus as a sign of a real camera feed or progressively focus-sweep the foreground to background and see if the resulting in-focus contours correspond to the expected 3D structure of the scene. In another implementation, if the camera has an autofocus function, locking the AF after initial focus and changing the object-camera distance should result in in the focused image becoming defocused, and removing that AF lock should bring back the object into focus (assuming the focus metering points are on the subject), all as signs of untampered camera pipeline.

In one implementation, the challenge may occur over two or more frames for cameras in which the response doesn't immediately occur. For example, in some cameras the exposure change doesn't immediately take effect. This results in a multi-frame transitory regime evident from the image sequence brightness. Such gradual change of exposure can be also leveraged to detect a real camera. This may also be camera dependent. However, the camera type may be inferred from the platform type and release model of the computing device. For example, a specific model of the Android® Platform may have a particular camera type with camera dependent characteristics.

In one implementation, the challenge is that the interrogating side asks the camera to change its resolution and the interrogator observes the effects on the receiving end to ascertain whether the camera is a real/non-simulated camera. In some implementations, the requested resolution is non-standard, where a real camera is expected not to honor such a non-standard resolution but a virtual camera may. In some implementations, a natively higher resolution camera (e.g., 1080p) is asked to capture images at a lower resolution (e.g., 480p). Then the camera is asked to render its output into an HTML Canvas at exactly double the resolution (2×) of the camera output using the nearest neighbor method for up-sampling. A real camera will show a corresponding blockiness as a result of the nearest neighbor up-sampling, whereas a virtual camera may not. One method to discover such a trend is to compare the 2× nearest neighbor down-sampled followed by the 2× nearest neighbor up-sampled image with the original (e.g., by calculating the mean squared error over the whole image or a portion of it). A real camera capture should show no difference. In some implementations, one may use the expected delay for restarting a real camera at a new resolution when challenging the camera to change its resolution as a sign of the camera being real, whereas a virtual camera may not show such delay when forced into a new resolution. In certain cases, the attack can have a static image presented as a video, where having a high structural similarity index measure (SSIM) for two different resolutions can detect the camera injection attack. In one implementation, the SSIM can be measured across several frames to determine camera injection.

In one implementation, the challenge is a camera integrity check. The interrogator may simply ask the operating system of the computing device to provide the camera hardware name, make, model, version, etc., and check if the reported metadata matches metadata provided by the camera hardware, or an unexpected value in the case of a virtual camera.

In one implementation, the challenge is changing the anti-flicker setting when artificial lighting is present, by forcing the anti-flicker setting to assume the wrong value based on location (i.e., setting the anti-flickering mechanism frequency to 50 Hz for a camera operating in a location in the United States, or 60 Hz when in Europe), and detect the induced flicker in the video captures.

In one implementation, the challenge includes detecting a rolling shutter image scan wobble, which would be expected during a moving camera image capture if the camera pipeline is intact.

In one implementation, the challenge is that a camera shake is triggered/suppressed by adjusting the OIS (optical image stabilization) function and a determination is made if the intended image shake (or lack thereof) can be observed as a sign of an intact camera pipeline.

It will be understood in the above challenges that in individual challenges that individual challenge may change one camera parameter value but hold other camera parameter values at a set of default values to simplify analysis of the resulting images. However, in theory, an individual challenge could change two or more camera parameter values simultaneously.

In the above description, for purposes of explanation, numerous specific details are set forth to provide a thorough understanding of the present disclosure. However, the technology described herein can be practiced without these specific details. Further, various systems, devices, and structures are shown in block diagram form to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method, comprising:
   interrogating a camera pipeline with instructions of a challenge requesting a response by the camera pipeline to at least one camera parameter value change;
   analyzing the response by the camera pipeline for features associated with a real camera pipeline response; and
   generating an output indicative of an integrity of the camera pipeline.

2. The method of claim 1, wherein the challenge comprises instructions for the camera pipeline to respond with at least one image captured utilizing a specified selection of camera parameter values, and the analyzing comprises analyzing features of the at least one image.

3. The method of claim 2, wherein the camera parameter values comprise at least one of a camera gain setting, a camera aperture setting, a camera shutter speed setting, a camera light source setting, a camera auto-balance setting, a white balance setting, a focus setting, an exposure setting, a resolution setting, an anti-flicker setting, an optical image stabilization setting, and a rolling shutter setting.

4. The method of claim 1, wherein the challenge comprises instructions for the camera pipeline to respond with a sequence of images captured utilizing a specified selection of camera parameter values, and the analyzing comprises analyzing features of the sequence of images that emerge after a plurality of frames.

5. The method of claim 4, wherein a classifier fuses results of a feature analysis of each of the images in the sequence of images.

6. The method of claim 1, wherein the challenge comprises instructing the camera pipeline to reply with a camera response corresponding to a sequence of captured images utilizing different selections of camera parameter values, and the analyzing comprises analyzing each captured image for features associated with a real camera pipeline response for the corresponding camera parameters values.

7. The method of claim 1, wherein generating an output comprises generating a confidence score indicative of the integrity of the camera pipeline.

8. The method of claim 6, wherein generating the output comprises weighting results for each of the captured images in the sequence.

9. A method of interrogating a camera to ascertain camera integrity, comprising:

commanding a camera pipeline of a computing device with one or more instructions to capture at least one image with specified camera parameter values;

receiving at least one captured image from the camera pipeline;

analyzing image features of the at least one captured image for image features associated with a real camera; and generating an output indicative of integrity of the camera pipeline.

10. The method of claim 9, wherein the specified camera parameter values comprise at least one of camera gain setting, a camera aperture setting, a camera shutter speed setting, a camera light source setting, a camera auto-balance setting, a white balance setting, a focus setting, an exposure setting, a resolution setting, an anti-flicker setting, an optical image stabilization setting, and a rolling shutter setting.

11. The method of claim 9, wherein generating the one or more instructions comprise instructions for the camera pipeline to reply with a camera response corresponding to a sequence of captured images utilizing different selections of camera parameter values selected to identify a real camera response.

12. The method of claim 11, wherein generating the output comprises weighting results of analysis of features of each of the images in the sequence of captured images.

13. The method of claim 12, wherein a classifier weights results of feature analysis of each of the captured images in the sequence.

* * * * *